Patented Nov. 12, 1940

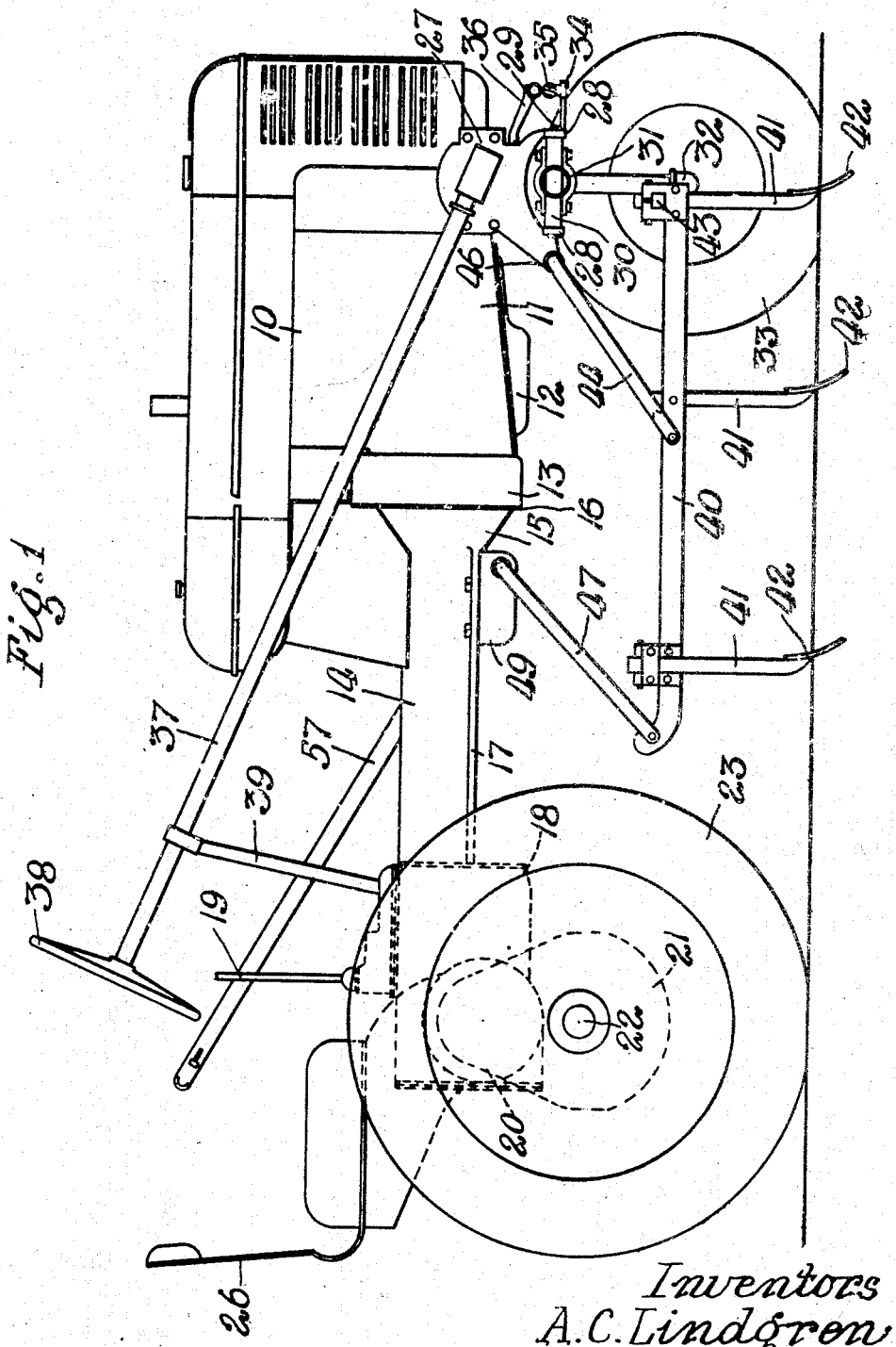

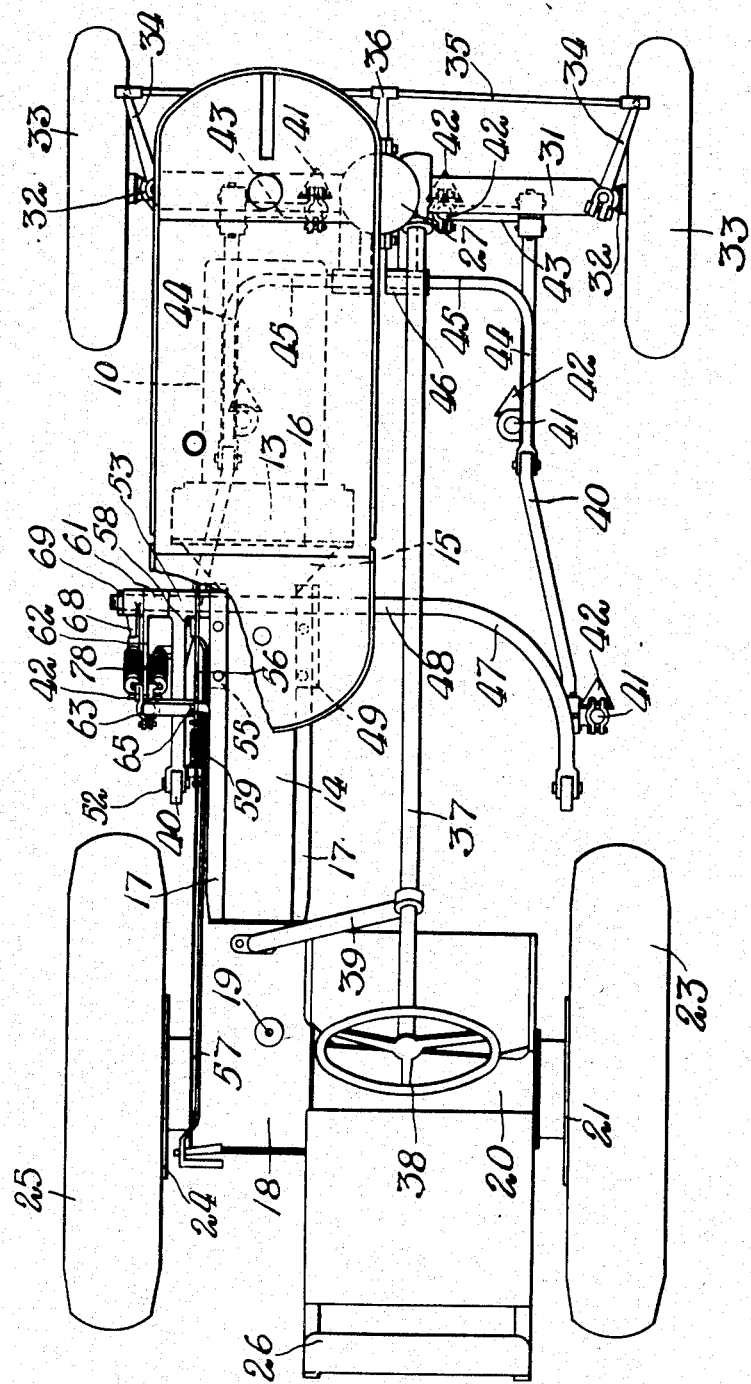

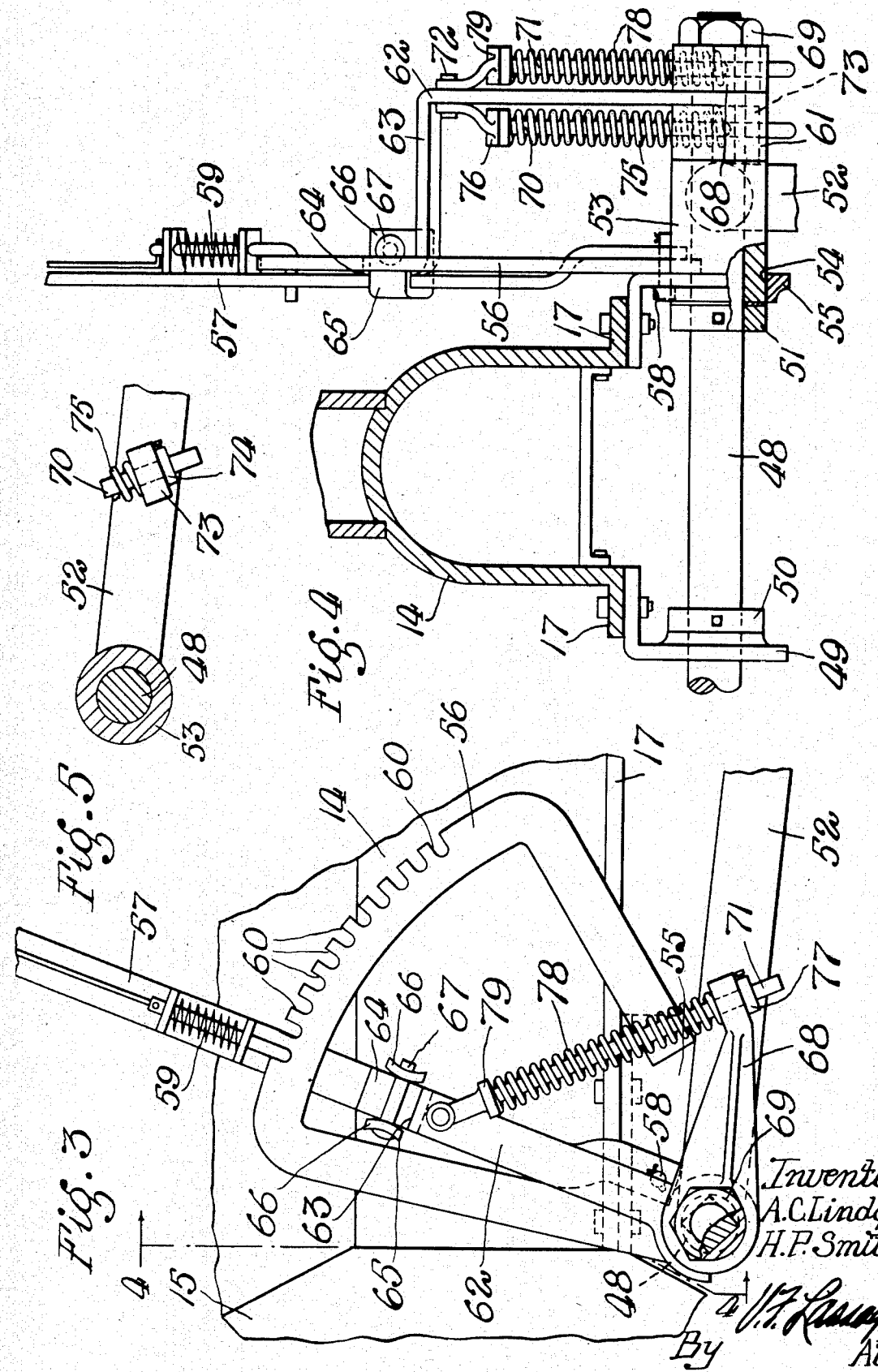

2,221,549

UNITED STATES PATENT OFFICE 2,221,549

TRACTOR IMPLEMENT

Alexus C. Lindgren, Chicago, and Hiram P. Smith, Canton, Ill., assignors to International Harvester Company, a corporation of New Jersey Application December 14, 1938, Serial No. 245,606

13 Claims. (Cl. 97—47)

This invention relates to a tractor implement. More particularly it relates to a row-crop cultivating attachment for tractors.

The principal object of the invention is to provide a row-crop cultivating attachment for a tractor particularly designed for one-row cultivation.

A more specific object is to provide a cultivator attachment operable adjacent the row substantially in transverse alinement with the steering wheels to thereby enable the operator to closely follow irregular rows.

Another object is to provide an attaching linkage in which the cultivating shovels are moved forwardly into the preferred position when lowered into operating position.

Another object is to provide a novel spring pressure means operable in connection with the lifting means to exert spring pressure on the cultivating means when in operating position.

The above objects and others which will be apparent from the detailed description to follow are accomplished by mounting cultivating beams at each side of the tractor on a parallel linkage of a type operable to move the beams forwardly as the implement is lowered into operating position. To provide for independent spring pressure means, the rear elements of the linkage are mounted for movement relative to each other, said elements being lifted simultaneously by the lifting means and independently urged downwardly by spring means whereby independent floating action is obtained within the desired limits.

In the drawings:

Figure 1 is an elevation of a tractor on which a cultivator embodying the invention is mounted, the front axle being broken away in section to remove one of the front wheels in order to better show the cultivating attachment;

Figure 2 is a plan view of the structure shown in Figure 1;

Figure 3 is an enlarged view from the left side of the tractor looking in the direction of forward movement of the lifting mechanism for the cultivating attachment;

Figure 4 is a section taken on the line 4—4 of Figure 3; and,

Figure 5 is a detail view of the lifting link for the cultivating beam at the same side of the tractor at which the lifting mechanism is located.

The tractor illustrated is of a particular type designed with an off-set frame structure to give maximum vision for single row operation. This tractor is disclosed and claimed in the copending application Serial No. 242,239, filed November 25, 1938. In the drawings of the application, the elements making up the tractor have been shown in outline and only such elements have been shown as are necessary to form a basis for disclosing the cultivator attachment.

The tractor illustrated is one having a combined unit frame and power plant construction; that is, one in which the crank-case of the engine forms a structural unit of the frame. An engine 10 is shown in outline, said engine having a crank-case 11 which forms the forward portion of the frame structure. An oil pan 12 is shown located beneath the crank-case 11. A fly-wheel and clutch housing 13 may be formed as a unit with the crank-case 11 or rigidly secured thereto. A narrow rear frame member 14 in the form of a casting, U-shaped in cross-section, is provided with a flared front end portion 15 to provide a flange 16, by means of which the rear frame member is secured to the flywheel housing 13. The frame member 14 is provided with apertured lateral flanges 17 to provide for connecting implements at a plurality of longitudinally spaced locations.

At its rear end, the frame member 14 is rigidly secured to a transmission casing 18 which contains a change-speed transmission for delivering the engine power of the tractor to the final drive mechanism. It is to be understood that a propeller shaft extends from the fly-wheel housing 13 rearwardly to the transmission casing 18. A gear shift lever 19 is shown extending upwardly of the transmission 18 within reach of the operator's station. The transmission casing 18 is extended rearwardly to include also the usual differential mechanism for the final drive. At the right side of the casing 18, a rear axle housing structure 20 is rigidly secured, extending a substantial distance outwardly at that side of the tractor. The length of the housing structure 20 is sufficient to bring the center line of the tractor along one side of the power plant. By this construction the entire unit including the frame and the power plant is offset laterally to one side of the center line of the tractor. A gear housing 21 rigidly secured to a flange at the outer end of the structure 20 depends downwardly to form an arched rear axle construction. Said housing contains reduction gearing for driving a stub axle 22 which carries a pneumatic tired wheel 23.

At the left side of the casing 18, a housing 24 substantially the same as the housing 21 extends downwardly and encloses reduction gearing for driving a stub axle which carries a pneumatic tired wheel 25.

An operator's seat 26 is mounted by suitable means on the rear axle housing structure. Said seat is located somewhat to the rear of the axis of the rear wheel and as far to the right as possible. This position of the seat is an important feature in connection with the visibility provided by off-setting the frame structure of the tractor.

A steering gear housing and front end supporting member 27 is rigidly secured on a vertically faced portion of the crank-case casting by means of a plurality of cap screws. Said member is provided with longitudinally spaced, downwardly extending portions 28 which are formed with alined openings for a pivot pin 29. Said pin also extends through a bore formed in an axial connecting member 30 having an upwardly extending portion fitted between and abutting the two downwardly extending portions 28.

The member 30 is mounted on a transversely extending front axle 31. Steering knuckles 32 connected to the outer ends of the axle 31 carry front wheels 33. Forwardly extending steering arms 34 are connected by tie rods 35 to a center steering arm 36. Said steering arm extends forwardly from the member 27. Mechanism, not shown in detail, is contained in the member 27 for oscillating the steering arm 36 to angle the front wheels 33, as required. A steering shaft 37 extends from the member 27 upwardly and carries a steering wheel 38 adjacent the operator's seat 26. A supporting bracket 39 connected to the casing 18 supports the rear end of the steering shaft 37.

To support the cultivating means two longitudinally positioned beams 40 are supported by suitable linkage on the frame structure on the tractor. Each of the beams 40 carry three vertical standards 41 on which soil engaging shovels 42 are positioned. The front standards 41 are mounted for lateral adjustment on transverse shanks 43. Said shanks are provided to adjust the positions of the front shovels with respect to the row of plants to which they pass as closely as possible in order to cultivate closely to the plants. The rear ends of the beams 40 diverge outwardly to off-set the positions of the rear shovels.

At points rearwardly of the front ends of the beams 40, lifting links 44 are pivotally connected on a transverse axis. Said links have inwardly extending horizontal portions 45 at their upper ends which are journaled in brackets 46. Said brackets are carried by the supporting member 27 and are formed as integral extensions thereof. As the member 27 is rigid with the frame structure of the tractor, the links 44 may be considered as being pivotally supported on the frame structure of the tractor, the member 27 forming only a rigid extension therefrom. With the implements in soil engaging position, as shown in Figure 1, the links 44 extend rearwardly at an angle somewhat more than 45 degrees with respect to vertical. The rear ends of the beams 40 are curved upwardly to provide connection points for the rear lifting links. The lifting link 47 is connected to the beam 40 at the right side of the tractor. This link is curved upwardly with the upper end extending transversely across the tractor, being formed as a shaft 48. Said shaft is rotatably supported in a bearing bracket 49 at the right side of the tractor. Said bracket includes a vertical portion through which the shaft extends and a horizontal portion secured to the flange 17 at the right side of the frame member 14. A collar 50, as shown in Figure 4, is fixed on the shaft 48 to prevent movement of the shaft 48 in an outward direction. A similar collar 51 is secured to said shaft to prevent lateral movement in the other direction. This collar will be later referred to.

A lifting link 52 is connected to the beam 40 at the left of the tractor. Said link extends forwardly and upwardly and is rigidly secured to or formed with a sleeve 53, rotatably journaled on the shaft 48. As best shown in Figure 4, one end of the sleeve 53 extends through an opening 54 in an attaching bracket 55 similar to the attaching bracket 49 at the other side. The bracket 55 is secured to the flange at its side of the frame member 14. It will be noted that the sleeve 53 abuts the collar 51. A quadrant 56 is secured by welding to the vertical face of the bracket 55. A lifting lever 57 is pivoted to the vertical face of the bracket 55 by a pivot pin 58 shown both in Figures 3 and 4. Said lever is provided with a detent mechanism 59 operative to engage a plurality of notches 60 in the quadrant 56.

Outwardly beyond the sleeve 53, a sleeve 61 is rotatably mounted on the shaft 48. An upwardly extending lever arm 62 rigidly secured adjacent one end of the sleeve 61 is provided with a horizontal portion 63 extending adjacent the lifting lever 57. For connecting the lever arm to the lifting lever, a vertical extension 64 is provided at the end of the horizontal portion 63. A U-shaped connecting member 65 rigidly secured to the lever 57 has two apertured lugs 66 extending beyond the vertical extension 64. A pin 67 extending through the apertures in said lugs holds the extension in position against outward movement. As the lever 57 is pivoted on the pin 58, somewhat eccentric to the pivot axis of the lever arm 62, the lugs 66 are arcuate in cross-section to provide for the slight angular movement necessary by the lifting lever 57 relative to the lever arm 62. An adjusting lever 68 is rigidly fixed on the outer end of the shaft 48 abutting the end of the sleeve 61. As shown by the portion broken away in section in Figure 3, the lever 68 is rigidly secured for angular movement on the shaft 48 by a square end portion on the shaft, being fitted into a square bore through the lever. A nut 69 threaded on the end of the shaft 48 holds the lever 68 in position and maintains all of the sleeves described in position on the shaft.

Adjacent the top of the vertical portion of the lever arm 62, adjusting rods 70 and 71 are secured on a common axis by a pivot pin 72. The adjusting rod 70, as best shown in Figure 5, slidably extends through an opening in a lug 73 carried by the lifting link 52 adjacent its upper pivoted end. A stop collar 74 is adjustably secured to the lower end of the rod 70 to regulate the height to which the link is lifted. A compression spring 75 abuts the upper surface of the lug 73 and a stop 76 in the form of an enlargement of the rod 70 near its upper end.

The rod 71, as best shown in Figure 3, passes slidably through an opening formed in the lever 68. A stop collar 77 is adjustably secured to the rod 71 abutting the lower surface of the lever during lifting and when the implement is in lifted position. A compression spring 78 abuts the upper side of the lever 68 and a stop 79 in the form of an enlargement of the rod 70 near its upper end.

It will be noted that in Figure 1 the cultivator is lowered into working position with the shovels 42 indicated as extending below the ground level. The lifting lever 57 is also shown in its lowermost position which indicates that the implement is lowered to its maximum position in that direction. Figures 3 and 4 show the lifting lever 57 in its uppermost position, that is, with the cultivator lifted to the uppermost position. The operation of the cultivator to move from one position to the other will now be described.

Referring to Figures 3 and 4, when it is desired to lower the cultivator, the detent mechanism 59 is released and the lever 57 is moved downwardly. As the lever arm 62 is connected to the lever 57, said arm also is rotated in the same angular direction.

The rods 70 and 71 are moved downwardly permitting the lever 67 to rotate in a downward direction following the stop 77 on the lifting rod. The lifting lever 47, which is connected to said lever, also moves downwardly, thereby moving the beam 40 downwardly and forwardly on its substantially parallel link suspending means. Although the lifting links at the front and the rear are in parallel, the approach to a parallel linkage is sufficient to provide for sufficient adjustment of the beams 40 without altering appreciably the operating depth of the front and rear shovels.

As the lever arm 62 moves in the angular direction of the lever 57, the lifting rod 70 allows the lifting link 52 to drop simultaneously with the link 47 and to the same position.

After the shovels have reached and engaged the soil, it is sometimes desirable either to force initial penetration or to maintain depth when operating to apply spring pressure against the beams 40. This is accomplished in the device of the invention by means of the compression springs 75 and 76. When the lever 57 is moved further down than is necessary to engage the shovels sufficiently to support the weight of the beams 40, the rods 70 and 71 slide through, respectively, the lug 73 and the apertured end of the lever 68 compressing the springs and independently exerting spring pressure against the lifting links 47 and 52. This independent arrangement permits within the limits of the spring movement independent floating action of the beams 40 with respect to the tractor. This is a very desirable condition, as cultivation is always carried on where soil irregularities are encountered both as to the force necessary to maintain the shovels in the soil and as to the depth of the soil at different sides of the tractor relative to the position of the tractor. By means of the independent resilient means, the implements may always be lifted positively to the same height while spring pressure acts independently on the individual beams.

It will be understood that applicants have shown and disclosed only a preferred embodiment of their improved cultivating attachment for tractors, and that they claim as their invention all modifications falling within the scope of the appended claims.

What is claimed is:

1. In a tractor having laterally spaced rear wheels and a longitudinal frame structure offset laterally to one side of a center line between the wheels, a cultivating attachment comprising implement beams at opposite sides of the tractor, means for connecting the forward ends of the beams to the frame structure, a lifting link connected to the rear end of one of the beams, said link extending upwardly and being provided with a transverse shaft portion extending laterally across the offset frame structure and projecting therebeyond and being pivotally mounted on a transverse axis on the frame structure, a lifting link for the beam at the other side of the tractor, said link extending upwardly and forwardly and being pivotally mounted on the projecting end of the shaft portion of the first mentioned rear lifting links, lifting means on the frame structure, and lifting elements connected to said means and to the lifting links.

2. In a tractor having a longitudinal frame structure offset to one side of the center line of the tractor, a cultivating attachment comprising implement carrying beams at opposite sides of the tractor, attaching means at the front of the frame structure adjacent the center of the tractor for pivotally connecting the forward ends of the beams, a lifting link connected to the rear end of one of the beams, said link extending upwardly and forwardly and being provided with a transverse shaft portion mounted on a transverse axis on the frame structure, a lifting link for the beam at the other side of the tractor, said link extending upwardly and forwardly and being pivotally mounted on the shaft portion of the first mentioned rear lifting link, a lifting lever pivoted on the frame structure, and independent lifting elements connected to said lever and to each of the rear lifting links.

3. In a tractor having a longitudinal frame structure, a cultivating attachment comprising shovel carrying beams at opposite sides of the tractor, supporting links connected to the beams adjacent the forward ends, said links extending upwardly and forwardly and being pivotally connected to the frame structure of the tractor on a transverse axis, a rear lifting link connected to the rear end of one of the beams, said link extending upwardly and forwardly substantially parallel to the forward link at that side and being provided with a transverse shaft portion mounted on a transverse axis on the frame structure, a rear lifting link for the beam at the other side of the tractor, said link extending upwardly and forwardly and being pivotally mounted on the shaft portion of the first mentioned rear lifting link, a lifting lever pivoted on the frame structure, and lifting elements connected to said lever and to each of the rear lifting links.

4. In a tractor having a longitudinal frame structure, a cultivating attachment comprising shovel carrying beams at opposite sides of the tractor, supporting links connected to the beams adjacent the forward ends, said links extending upwardly and forwardly and being pivotally connected to the frame structure of the tractor on a transverse axis, a rear lifting link connected to the rear end of one of the beams, said link extending upwardly and forwardly substantially parallel to the forward link at that side and being provided with a transverse shaft portion mounted on a transverse axis on the frame structure, a rear lifting link for the beam at the other side of the tractor, said link extending upwardly and forwardly and being pivotally mounted on the shaft portion of the first mentioned rear lifting link, a lifting lever pivoted on the frame structure, and lifting elements connected to said lever and to each of the rear lifting links, said elements each incorporating spring pressure means whereby each of the rear lifting links is resiliently urged into operating position independently of the other.

5. In a tractor having four wheels and a longitudinal frame structure offset to one side of the center line between the wheels, a cultivating attachment comprising shovel carrying beams at opposite sides of the tractor, supporting links connected to the beams adjacent the forward ends, said beams extending upwardly and forwardly and being pivotally connected to the frame structure of the tractor on a transverse axis, a rear lifting link connected to the rear end of one of the beams, said link extending upwardly and forwardly substantially parallel to the forward link at that side and being provided with a transverse shaft portion extending laterally across the offset frame structure and being mounted thereon for angular movement on a transverse axis, a lifting link for the beam at the other side of the tractor, said link extending upwardly and forwardly and being connected to the frame structure for angular movement on a transverse axis, and means on the frame structure for rocking the rear links to raise and lower the implement.

6. In a tractor having four wheels and a longitudinal frame structure offset to one side of the center line between the wheels, a cultivating attachment comprising shovel carrying beams at opposite sides of the tractor, supporting links connected to the beams adjacent the forward ends, said beams extending upwardly and forwardly and being pivotally connected to the frame structure of the tractor on a transverse axis, a rear lifting link connected to the rear end of one of the beams, said link extending upwardly and forwardly substantially parallel to the forward link at that side and being provided with a transverse shaft portion extending laterally across the offset frame structure and being mounted thereon for angular movement on a transverse axis, a lifting link for the beam at the other side of the tractor, said link extending upwardly and forwardly and being connected to the shaft portion of the first mentioned rear lifting link, and means on the frame structure for rocking the rear links to raise and lower the implement.

7. In a tractor having four wheels and a longitudinal frame structure offset to one side of the center line between the wheels, a cultivating attachment comprising shovel carrying beams at opposite sides of the tractor, supporting links connected to the beams adjacent the forward ends, said beams extending upwardly and forwardly and being pivotally connected to the frame structure of the tractor on a transverse axis, a rear lifting link connected to the rear end of one of the beams, said link extending upwardly and forwardly substantially parallel to the forward link at that side and being provided with a transverse shaft portion extending laterally across the offset frame structure and being mounted thereon for angular movement on a transverse axis, a lifting link for the beam at the other side of the tractor, said link extending upwardly and forwardly and being pivotally mounted on the shaft portion of the first mentioned rear lifting link, a lifting lever pivoted on the frame, lifting elements connected to said lever and to each of the rear lifting links, said elements incorporating spring pressure whereby each of the rear lifting links is resiliently urged into operating position independently of the other.

8. An implement lifting device for tractors having a frame structure and implement beams mounted on opposite sides of the tractor for movement vertical with respect thereto, comprising a lifting link having a shaft portion journaled on the frame structure and connected to one of the implement beams, a second lifting link journaled on said shaft portion and pivotally connected to the other implement beam, a lever rigidly connected to the shaft portion, an adjusting member pivotally mounted on the shaft portion, lifting elements connected to said adjusting member and to the lever arm and the lifting link, a quadrant mounted on the frame structure of the tractor, an adjusting lever mounted for operation along said quadrant, and means for connecting the adjusting member to said lever.

9. An implement lifting device for tractors having a frame structure and implement beams mounted on opposite sides of the tractor for vertical movement with respect thereto, comprising a lifting link having a shaft portion journaled on the frame structure and a downwardly depending portion connected to one of the implement beams, a sleeve journaled on said shaft portion, a second lifting link rigidly connected to said sleeve and pivotally connected to the other implement beams, a lever rigidly connected to the shaft portion adjacent said last mentioned link, an adjusting member pivotally mounted on the shaft portion between the lever arm and the lifting link, lifting elements pivotally connected to said adjusting member and extending through openings in the lever arm and in the lifting link, adjustable stops secured to said elements respectively below the lever arm and the lifting link, compression springs surrounding said elements and abutting stops formed at the upper ends of the elements and against the lever arm and the lifting link at their lower ends, a quadrant mounted on the frame structure of the tractor, an adjusting lever mounted for operation along said quadrant, and means for connecting the adjusting member to said lever.

10. In a row crop tractor having a front axle structure with spaced wheels, a rear axle structure having spaced wheels said structure being adapted to straddle the same single plant row, a unit frame and power plant mounted laterally at one side of the longitudinal center line between the wheels and rigidly connected to the rear axle structure, means for pivotally connecting said unit frame and power plant to the center of the front axle structure and an operator's station at the rear of the tractor on the side opposite the power plant whereby an operator has complete vision ahead of the tractor to view an approaching row and also downwardly below the tractor to observe the passage of plants beneath the tractor, and in combination therewith a field implement for operating on the plant row comprising a pair of implement beams connected to the tractor and positioned adjacent the longitudinal center line thereof, soil working elements carried by said beams in locations adapted to operate alongside the plant row during forward travel of the tractor.

11. In a row crop tractor having a front axle structure with spaced wheels, a rear axle structure having spaced wheels, said structures being adapted to straddle a plant row, a frame structure carrying a power plant thereon entirely laterally at one side of the longitudinal center line between the wheels and rigidly connected to the rear axle structure, means for pivotally connecting said frame structure to a mid-point of the front axle structure and an operator's station at the rear of the tractor on the side opposite the power plant whereby an operator has complete vision ahead of the tractor to view an approaching row, downwardly below the tractor and laterally to the side opposite to the frame structure to observe the passage of plants beneath and at one side of the tractor, and in combination therewith a field implement for operating on the plant row comprising a tool supporting structure connected to the tractor, and tools carried by said structure in locations adapted to operate along the plant row during forward travel of the tractor.

12. In a row crop tractor having a front axle structure with spaced wheels, a rear axle structure having spaced wheels, said structures being adapted to straddle a plant row, a frame structure carrying a power plant thereon entirely laterally at one side of the longitudinal center line between the wheels and rigidly connected to the rear axle structure, means for pivotally connecting said frame structure to a mid-point of the front axle structure and an operator's station at the rear of the tractor on the side opposite the power plant whereby an operator has complete vision ahead of the tractor to view an approaching row, downwardly below the tractor and laterally to the side opposite to the frame structure to observe the passage of plants beneath and at one side of the tractor, and in combination therewith a field implement for operating on the plant row comprising a pair of implement beams connected to the tractor and having portions positioned along the plant row, and tools carried by said beams in locations adapted to operate along the plant row during forward travel of the tractor.

13. In a row crop tractor having a front axle structure with spaced wheels, a rear axle structure having spaced wheels, said structures being adapted to straddle a plant row, a frame structure carrying a power plant thereon entirely laterally at one side of the longitudinal center line between the wheels and rigidly connected to the rear axle structure, means for pivotally connecting said frame structure to a mid-point of the front axle structure and an operator's station at the rear of the tractor on the side opposite the power plant whereby an operator has complete vision ahead of the tractor to view an approaching row, downwardly below the tractor and laterally to the side opposite to the frame structure to observe the passage of plants beneath and at one side of the tractor, and in combination therewith a field implement for operating on the plant row comprising a pair of implement beams pivotally connected to the tractor frame structure adjacent the front thereof said beams having portions positioned along the plant row, and tools carried by said beams in locations adapted to operate along the plant row during forward travel of the tractor.

ALEXUS C. LINDGREN.
HIRAM P. SMITH.